US007197344B2

(12) United States Patent
Ahn et al.

(10) Patent No.: US 7,197,344 B2
(45) Date of Patent: Mar. 27, 2007

(54) LOCKING MECHANISM

(75) Inventors: Sung-Woong Ahn, Seoul (KR); Yun-Taek Jung, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 206 days.

(21) Appl. No.: 10/808,776

(22) Filed: Mar. 24, 2004

(65) Prior Publication Data

US 2004/0189011 A1 Sep. 30, 2004

(30) Foreign Application Priority Data

Mar. 25, 2003 (KR) ..................... 10-2003-0018526
Mar. 25, 2003 (KR) ..................... 10-2003-0018528

(51) Int. Cl.
*H04M 1/00* (2006.01)

(52) U.S. Cl. ............................ 455/575.1; 379/428.01; 379/433.11

(58) Field of Classification Search ............. 455/575.1, 455/575.4, 575.8; 379/428.04, 433.11–433.12, 379/440, 437, 445, 424, 425, 428.01, 428.02, 379/433.01, 433.08; 292/121, 163, 150, 292/145, 175, 302; 429/97, 123, 163
See application file for complete search history.

(56) References Cited

U.S. PATENT DOCUMENTS 4,239,269 A * 12/1980 Chiang ....................... 292/175
5,615,250 A 3/1997 Kobayashi
5,621,618 A 4/1997 Komiyama
6,371,535 B2 * 4/2002 Wei et al. ................... 292/175
6,490,436 B1 * 12/2002 Kaiwa et al. ............. 455/90.1
6,549,791 B1 * 4/2003 Jeon et al. .................. 455/572
6,660,427 B1 * 12/2003 Hukill et al. ................ 429/97
6,785,567 B2 * 8/2004 Kato ....................... 455/575.9

FOREIGN PATENT DOCUMENTS

EP 0 802 660 A2 10/1997
EP 0 802 660 A3 10/1997
JP 03-084181 4/1991
JP 05-055585 7/1993
JP 05-297980 11/1993
JP 2000-269655 9/2000

* cited by examiner

*Primary Examiner*—George Eng
*Assistant Examiner*—Nam Huynh
(74) *Attorney, Agent, or Firm*—Lee, Hong, Degerman, Kang & Schmadeka

(57) ABSTRACT

A mobile telephone battery cover locking mechanism includes at least one latching member and at least one spring loaded locking member adapted to securely engage the latching member at one end when the latching member is fully inserted in at least one spacing provided at that end. The latching member forces the spring loaded locking member to move against its spring bias when the latching member is being inserted in the spacing with the spring loaded locking member having moved under its spring bias when the latching member is fully inserted in the spacing. The spring loaded locking member may be moved against its spring bias to allow the fully inserted latching member to disengage from the spring loaded locking member.

28 Claims, 8 Drawing Sheets

50 40 11 30 40 50
10
52
52a
53
21a
21b
20
21 51a 51 12 51 21

LOCKING MECHANISM

CROSS-REFERENCE TO RELATED APPLICATIONS

Pursuant to 35 U.S.C. § 119(a), this application claims the benefit of earlier filing date and right of priority to Korean Patent Application Nos. 10-2003-0018526 and 10-2003-0018528, each one filed on Mar. 25, 2003, the contents of which are hereby incorporated by reference in their entirety.

BACKGROUND OF THE INVENTION

1. Field of the Invention

The present invention relates generally to locking devices and more particularly to a locking mechanism for a mobile telephone battery cover.

2. Description of the Related Art

FIG. 1 schematically illustrates a conventional locking mechanism 230 for a battery cover 220 being provided within a main body 100 of a mobile telephone set. Locking mechanism 230 is provided with a protective cover 240, which is coupled to main body 100.

FIGS. 2–3 schematically illustrate the various parts of conventional locking mechanism 230. Specifically, locking mechanism 230 includes a locking member 231 being movably coupled to a shaft support portion 201 formed in main body 100 via a shaft 231*a* and a spring 232. Spring 232 is mounted between locking member 231 and main body 100 and adapted to elastically support locking member 231. Locking member 231 includes a lock portion 231*b* adapted to engage a latching portion 220*a* of battery cover 220 for the purpose of locking battery cover 220 to main body 100.

Battery cover 220 may be unlocked from main body 100 by the user pressing on locking member 231 so as to disengage lock portion 231*b* from latching portion 220*a*. This type of locking arrangement is unfortunately not fool-proof as an external impact such as from dropping the mobile telephone on the ground may result in spring 232 being accidentally compressed enough to allow the release of lock portion 231*b* from latching portion 220*a* of battery cover 220.

SUMMARY OF THE INVENTION

In accordance with one aspect of the present invention, a locking mechanism comprises at least one latching member and at least one spring loaded locking member adapted to securely engage the latching member at one end when the latching member is fully inserted in at least one spacing provided at that end. The latching member forces the spring loaded locking member to move against its spring bias when the latching member is being inserted in the spacing with the spring loaded locking member having moved under its spring bias when the latching member is fully inserted in the spacing.

The locking mechanism also comprises means for moving the spring loaded locking member against its spring bias to allow the fully inserted latching member to disengage from the spring loaded locking member.

These and other aspects of the present invention will become apparent from a review of the accompanying drawings and the following detailed description of the present invention.

BRIEF DESCRIPTION OF THE DRAWINGS

The present invention is generally shown by way of reference to the accompanying drawings as follows.

DETAILED DESCRIPTION OF THE PREFERRED EMBODIMENTS

Some embodiments of the present invention will be described in detail with reference to the related drawings of FIGS. 1–10B. Additional embodiments, features and/or advantages of the invention will become apparent from the ensuing description or may be learned by practicing the invention.

In the figures, the drawings are not to scale with like numerals referring to like features throughout both the drawings and the description.

The following description includes the best mode presently contemplated for carrying out the invention. This description is not to be taken in a limiting sense, but is made merely for the purpose of describing the general principles of the invention.

Figure 1:
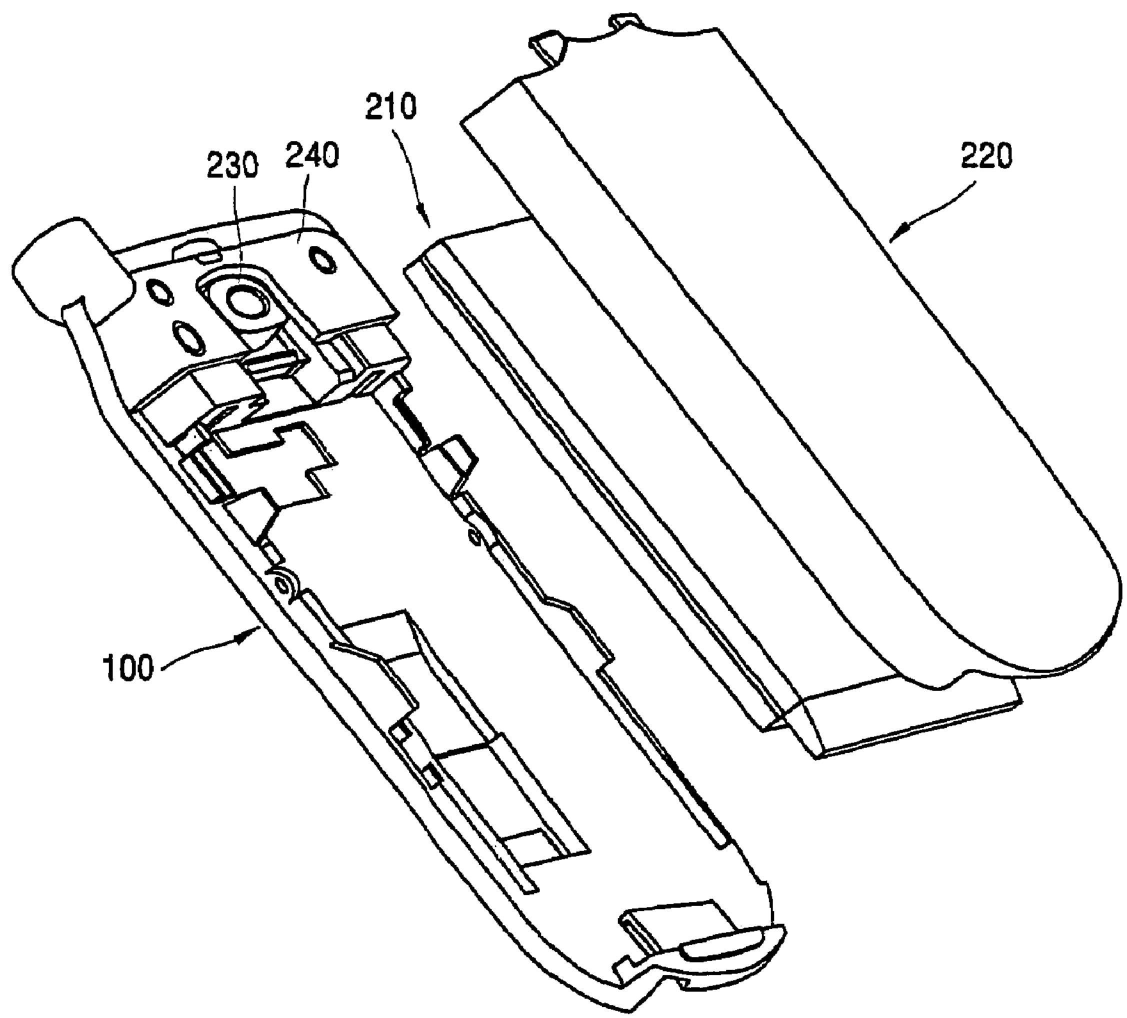
FIG. 1 schematically illustrates a conventional locking mechanism for a battery cover of a mobile telephone set.
Figure 2:
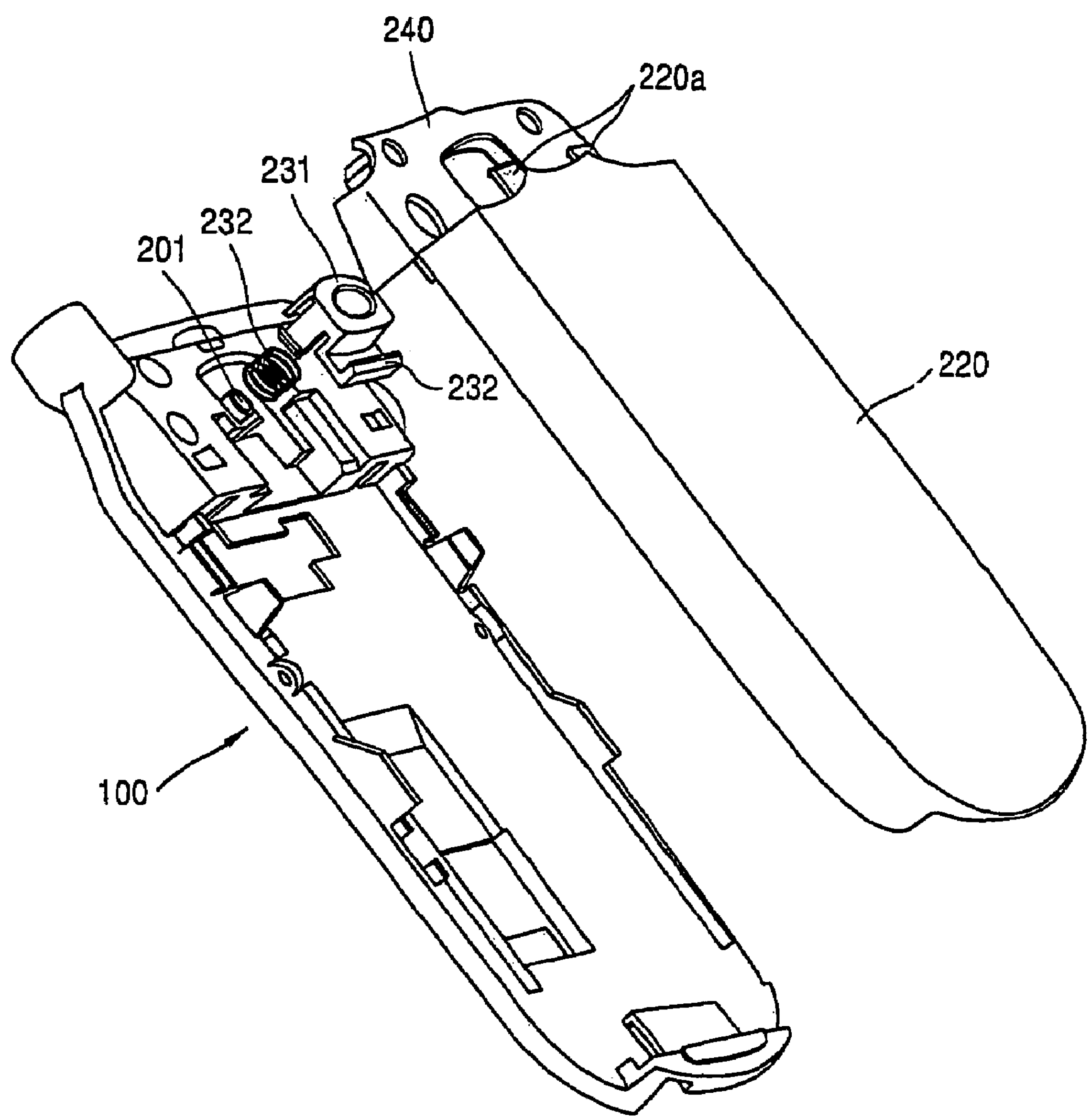
FIG. 2 schematically illustrates the general composition of the conventional locking mechanism of FIG. 1.
Figure 3:
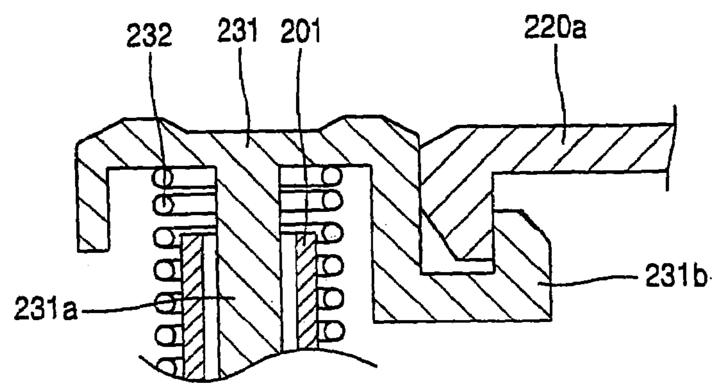
FIG. 3 further illustrates the composition of the conventional locking mechanism of FIG. 1.
Figure 4:
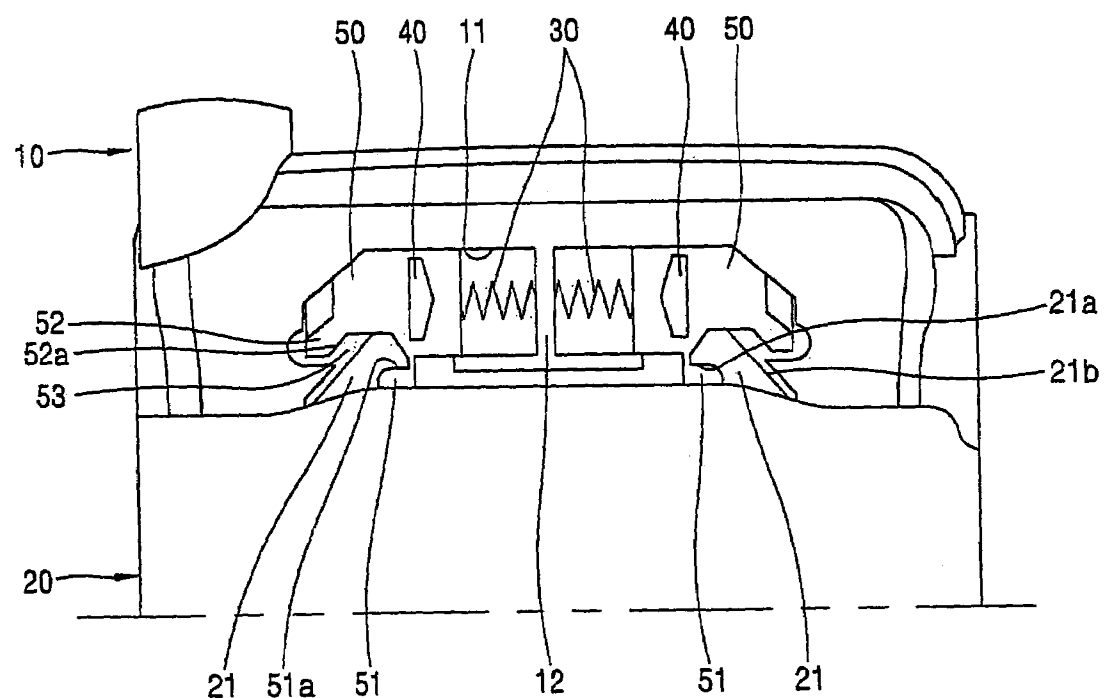
FIG. 4 schematically illustrates a locking mechanism in accordance with one embodiment of the present invention.

FIG. 4 schematically illustrates a locking mechanism in accordance with a preferred embodiment of the present invention. The locking mechanism may be used to securely lock a battery cover to the main body of a mobile telephone set, as generally shown in reference to FIG. 4. The battery cover locking mechanism of FIG. 4 preferably comprises a pair of oppositely disposed generally hook-shaped latching members 21 formed on a battery cover 20, and a pair of locking members 50 movably disposed opposite each other within a main body 10 of a mobile telephone set and adapted to engage latching members 21 to secure battery cover 20 to main body 10. The battery cover locking mechanism also comprises a pair of knobs 40, each one extending integrally from a corresponding locking member 50 and to which an external force may be applied for moving linearly locking members 50, and a pair of oppositely disposed elastic members 30, each one operatively coupled between a corresponding locking member 50 and a support member 12 which is formed in the middle of a groove 11, as generally shown in FIG. 4. Groove 11 is disposed in main body 10 and used to guide the linear movement of locking members 50. Support member 12 is used to support elastic members 30.

Each locking member (50) includes a pair of generally oppositely disposed first and second locking legs 51, 52 adapted to form an insertion space 53 for latching member 21. First and second locking legs 51, 52 are preferably adapted to engage a corresponding latching member 21 within its respective insertion space 53 to securely lock battery cover 20 to main body 10. Specifically, an inner surface 51*a* of first locking leg 51 is adapted to engage a corresponding inner surface 21*a* of latching member 21 to catch the same within insertion space 53, as generally illustrated in FIG. 4.

Second locking leg 52 includes an inner surface 52*a*, which is inclined at a predetermined angle so as to generally match the curvature of a corresponding outer surface 21*b* of latching member 21. When latching member 21 is in the process of being released from the grip of first and second locking legs 51, 52, second locking leg 52 pushes latching member 21 out of insertion space 53 whereby the width of inclined inner surface 52*a* is related to the pushing force on latching member 21. In general, the bigger the width of inner surface 52*a*, the greater the force with which latching member 21 is being pushed. Outer surface 21*b* of latching member 21 is adapted to allow latching member 21 generally smooth entry into insertion space 53 with outer surface 21*b* pushing against inner surface 52*a* of second locking leg 52 when battery cover 20 is being locked to main body 10.

Each elastic member 30 may be in the form of a spring coupled between a corresponding locking member 50 and support member 12 with the springs disposed opposite each other and each spring being biased toward a corresponding latching member (21). Alternatively, a single elastic member 30 may include a spring operatively coupled between locking members 50 and being biased at each end toward a corresponding latching member (21). Yet another alternative may include a spring coupled between each locking member 50 and main body 10 with the springs disposed opposite each other and each spring being biased toward a corresponding latching member (21). A person skilled in the art would readily recognize that various other ways and configurations may be utilized to spring load locking members 50 in the manner described hereinabove.

Knobs 40 protrude from locking members 50 to provide gripping surface for the user. The user moves locking members 50 toward/away from each other by way of integral knobs 40, respectively.

Figure 5A:
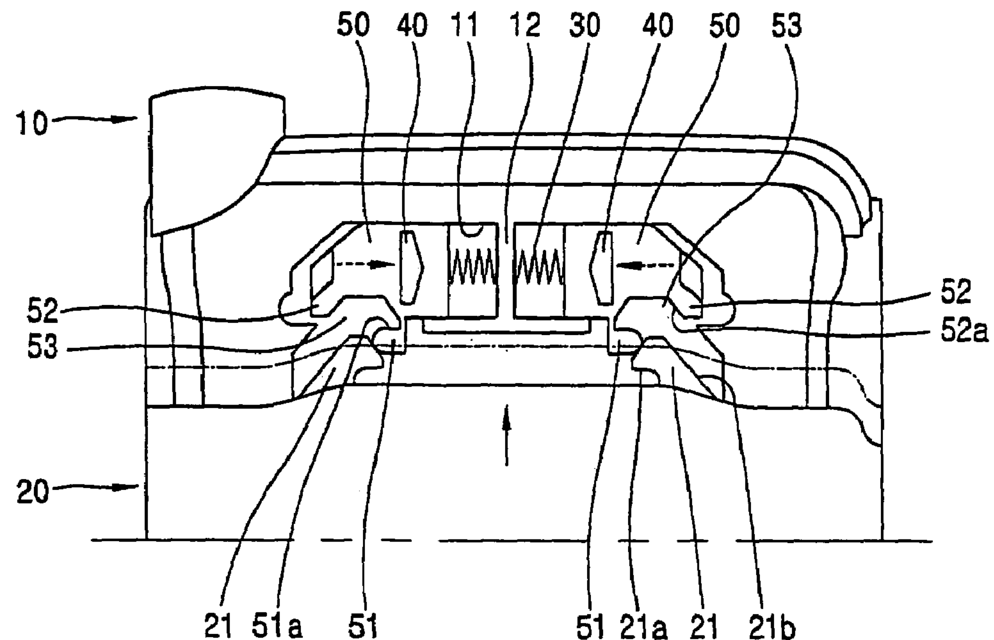
FIGS. 5A and 5B schematically depict the locking of a battery cover to the main body of a mobile telephone set utilizing the locking mechanism of FIG. 4.
Figure 5B:
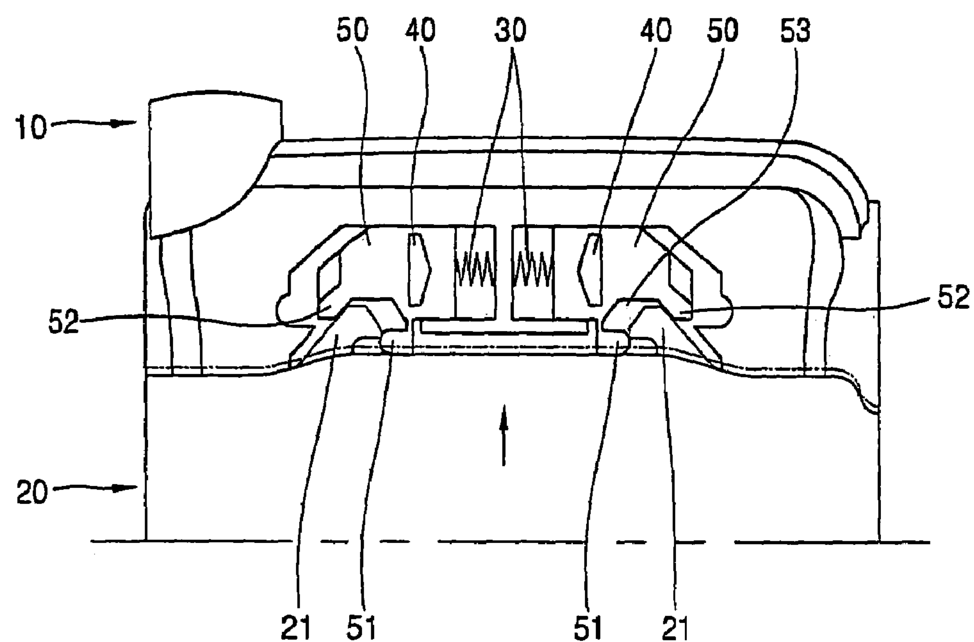

The process of locking battery cover 20 to main telephone body 10 is generally depicted in reference to FIGS. 5A–5B. Specifically, as each latching member (21) of battery cover 20 gradually enters its respective insertion space (53), each latching member 21 pushes against a corresponding first locking leg 51 forcing locking members 50 to move linearly closer to each other against the bias of elastic members 30, respectively.

Locking members 50 are disposed away from each other (having moved under the bias of respective elastic members 30) when each latching member 21 is fully inserted into its respective insertion space (53) formed on each side by first locking leg 51 and second locking leg 52, respectively. Full insertion may be defined as inner surface 51*a* of first locking leg 51 having engaged inner surface 21*a* of latching member 21 on each side, which results in battery cover 20 being locked securely to main body 10, as generally illustrated in FIG. 4. A person skilled in the art would immediately appreciate that spring loading locking members 50 in the manner described hereinabove and shown in the drawings helps prevent the accidental release of a locked battery cover 20 from main body 10.

Figure 6A:
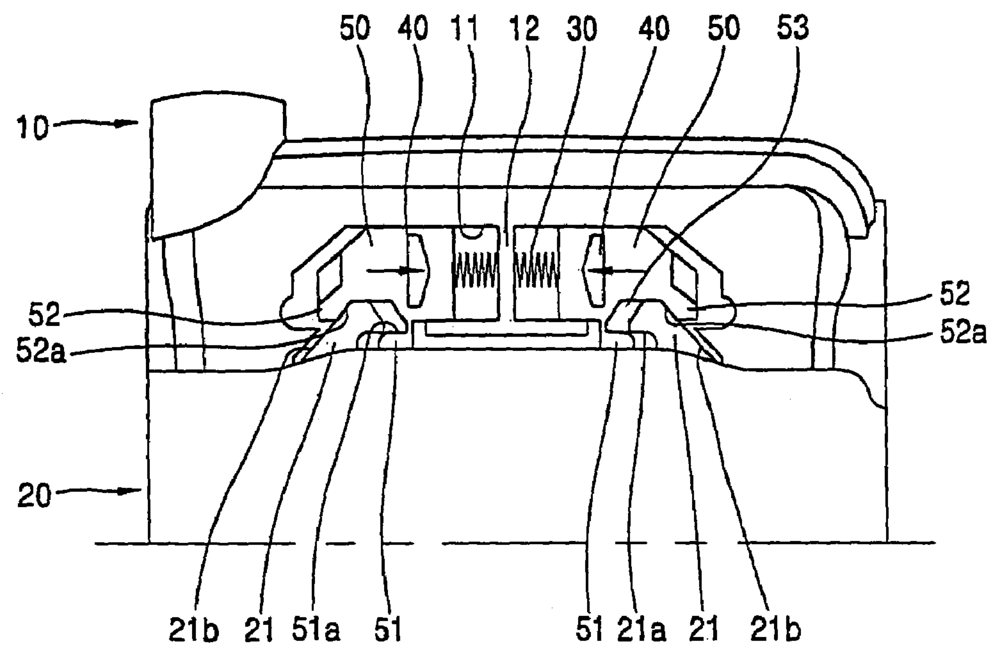
FIGS. 6A and 6B schematically depict the unlocking of a battery cover from the main body of a mobile telephone set utilizing the locking mechanism of FIG. 4.
Figure 6B:
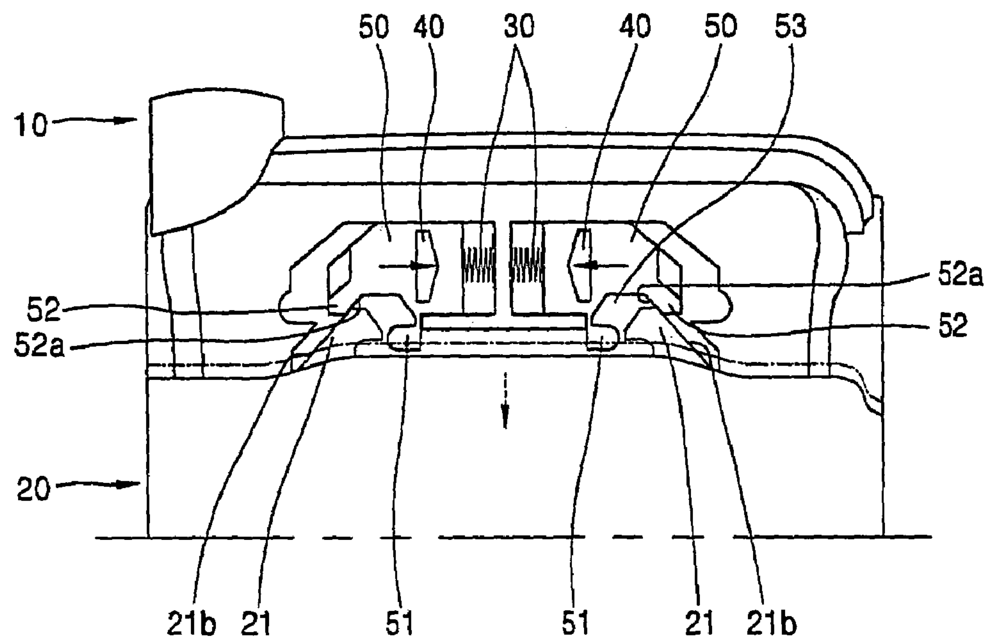

The process of unlocking battery cover 20 from main telephone body 10 is generally depicted in reference to FIGS. 6A–6B. Specifically, the user grips knobs 40 (not shown) and forces locking members 50 to move linearly closer to each other against the bias of elastic members 30 to allow disengagement of inner surface 21*a* of latching member 21 from inner surface 51*a* of first locking leg 51, respectively, on each side. As each latching member (21) gradually moves out of its respective insertion space 53, inner surface 52*a* of second locking leg 52 pushes against outer surface 21*b* of its respective latching member 21 with latching member 21 sliding along inclined inner surface 52*a*, as generally shown in FIGS. 6A–6B, unlocking battery cover 20 from main body 10.

Figure 7:
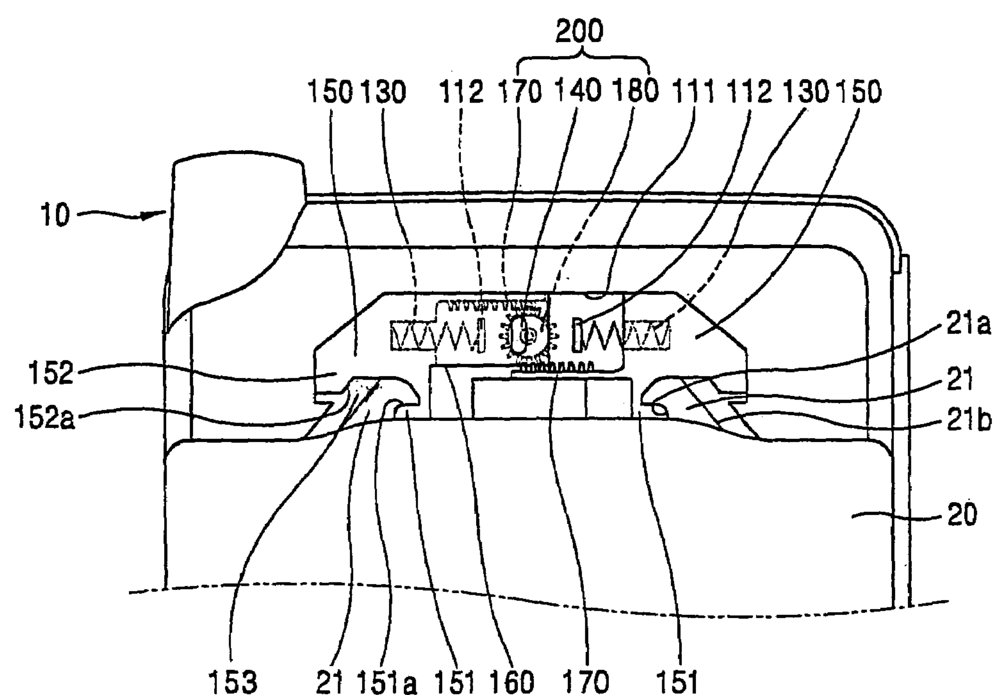
FIG. 7 schematically illustrates an alternative locking mechanism in accordance with another embodiment of the present invention.

FIG. 7 schematically illustrates an alternative locking mechanism in accordance with another preferred embodiment of the present invention. The locking mechanism may be used to securely lock a battery cover to the main body of a mobile telephone set, as generally shown in reference to FIG. 7. The battery cover locking mechanism of FIG. 7 preferably comprises a pair of oppositely disposed generally hook-shaped latching members 21 formed on battery cover 20, and a pair of locking members 150 movably disposed opposite each other within main telephone body 10 and adapted to engage latching members 21 to secure battery cover 20 to main body 10. The battery cover locking mechanism of FIG. 7 also comprises a pair of oppositely disposed elastic members 130, each one operatively coupled between a corresponding locking member 150 and a support member 112 which is formed in the middle of a groove 111, as generally shown in FIG. 7. Groove 111 is disposed in main body 10 and used to guide the linear movement of locking members 150. Support member 112 is used to support elastic members 130.

Each locking member (150) includes a pair of generally oppositely disposed first and second locking legs 151, 152 adapted to form an insertion space 153 for latching member 21. First and second locking legs 151, 152 are preferably adapted to engage a corresponding latching member 21 within its respective insertion space 153 to securely lock battery cover 20 to main body 10. Specifically, an inner surface 151*a* of first locking leg 151 is adapted to engage a corresponding inner surface 21*a* of latching member 21 to catch the same within insertion space 153, as generally illustrated in FIG. 7.

Second locking leg 152 includes an inner surface 152*a*, which is inclined at a predetermined angle so as to generally match the curvature of a corresponding outer surface 21*b* of latching member 21. When latching member 21 is in the process of being released from the grip of first and second locking legs 151, 152, second locking leg 152 pushes latching member 21 out of insertion space 153. Outer surface 21*b* of latching member 21 is adapted to allow latching member 21 generally smooth entry into insertion space 153 with outer surface 21*b* pushing against inner surface 152*a* of second locking leg 152 when battery cover 20 is being locked to main body 10.

Each elastic member 130 may be in the form of a spring coupled between a corresponding locking member 150 and support member 112 with the springs being disposed opposite each other and each spring being biased toward a corresponding latching member (21). Alternatively, a single elastic member 130 in the form of a spring may be used to spring load just one or both locking members 150 in the manner described hereinabove. Other spring loading configurations may be utilized provided such other configurations do not depart from the intended purpose of the present invention.

The battery cover locking mechanism of FIG. 7 further comprises a locking member moving apparatus (LMMA) 200 which may be utilized to move locking members 150 toward/away from each other. LMMA 200 includes a connection link 160 integrally extending from one of the locking members (150), a knob 140 protruding from connection link 160, a pair of oppositely disposed rack gears 170 with each rack gear extending from a respective locking member (150), and a pinion gear 180 rotatably disposed in guiding groove 111 and adapted to mesh with rack gears 170.

Figure 8:
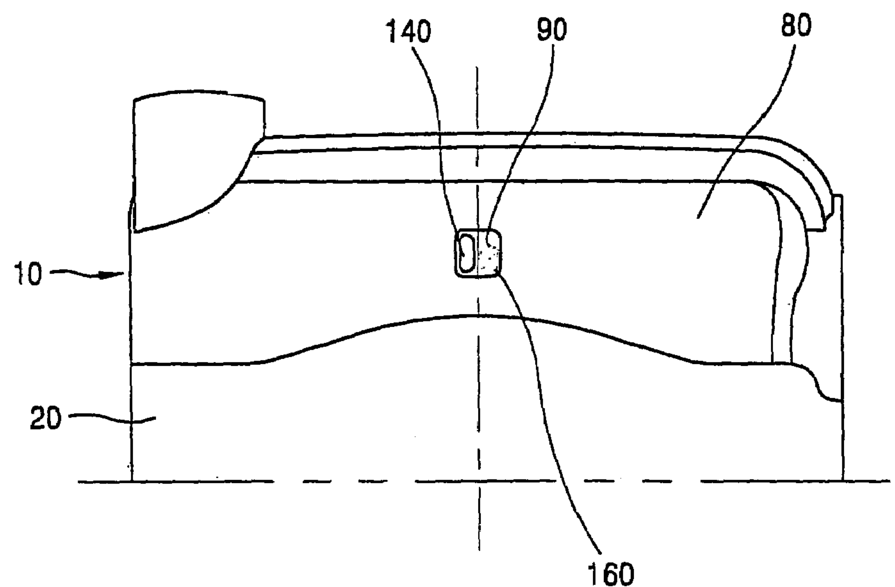
FIG. 8 schematically illustrates the general exterior of a mobile telephone set in accordance with the embodiment shown in reference to FIG. 7.

Knob 140 is adapted to protrude through an aperture 90 formed in a locking mechanism cover 80, as generally shown in FIG. 8. Knob 140 is adapted for gripping by the user. The user moves connection link 160 linearly via knob 140 to unlock battery cover 20 from main telephone body 10.

Figure 9A:
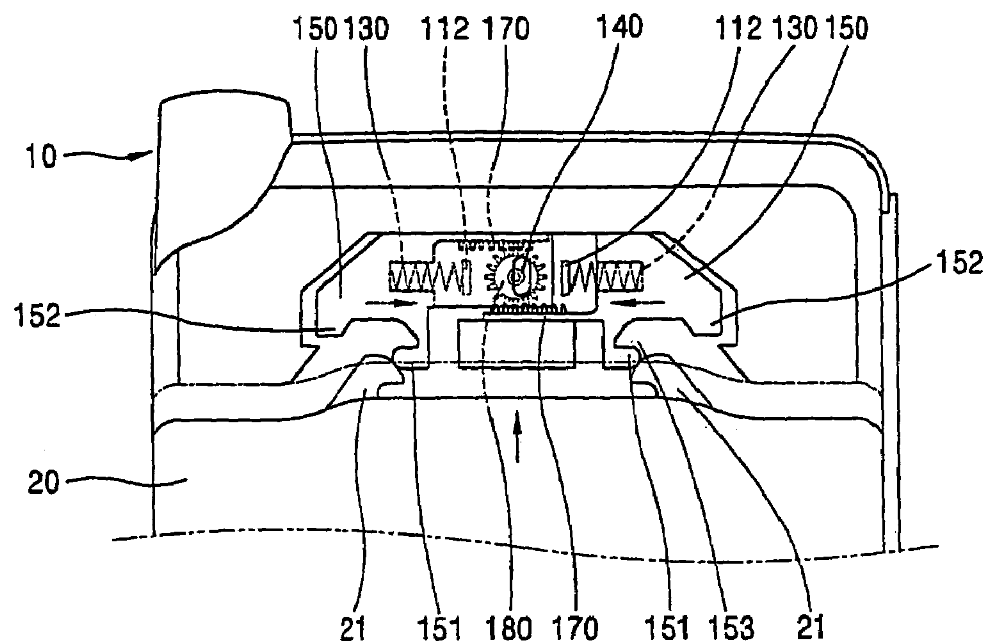
FIGS. 9A and 9B schematically depict the locking of a battery cover to the main body of a mobile telephone set utilizing the locking mechanism of FIG. 7.
Figure 9B:
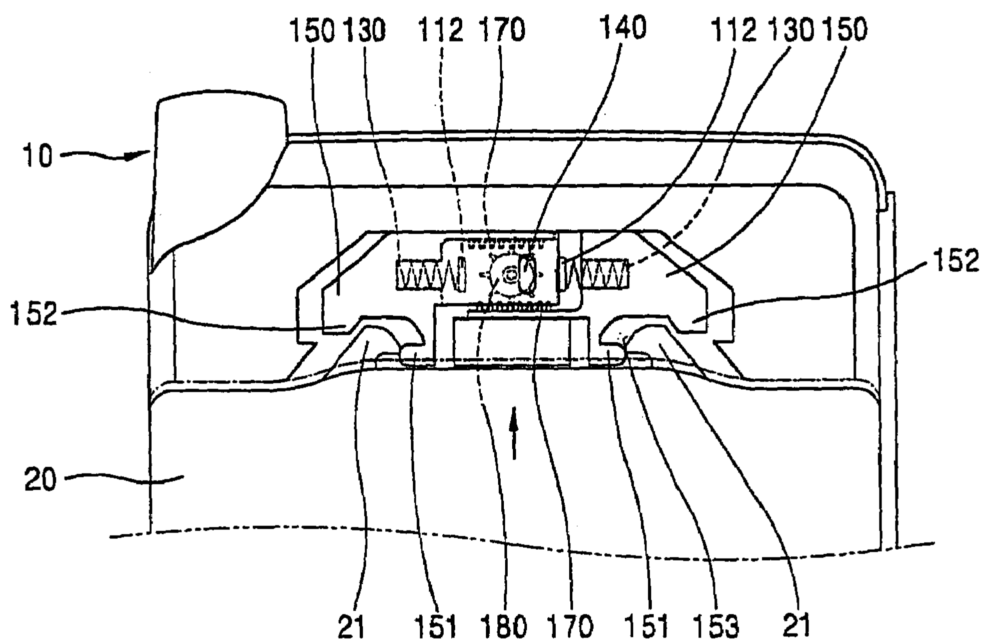

The process of locking battery cover 20 to main telephone body 10 is generally depicted in reference to FIGS. 9A–9B. Specifically, as each latching member (21) of battery cover 20 gradually enters its respective insertion space (153), each latching member 21 pushes against a corresponding first locking leg 151 forcing locking members 150 to move linearly closer to each other against the bias of elastic members 130, respectively.

Locking members 150 are disposed away from each other (having moved under the bias of respective elastic members 130) when each latching member 21 is fully inserted into its respective insertion space (153) formed on each side by first locking leg 151 and second locking leg 152, respectively. Full insertion may be defined as inner surface 151*a* of first locking leg 151 having engaged inner surface 21*a* of latching member 21 on each side, which results in battery cover 20 being locked securely to main body 10, as generally illustrated in FIG. 7. A person skilled in the art would undoubtedly appreciate that spring loading locking members 150 in the manner described hereinabove and shown in the drawings helps prevent the accidental release of a locked battery cover 20 from main body 10.

Figure 10A:
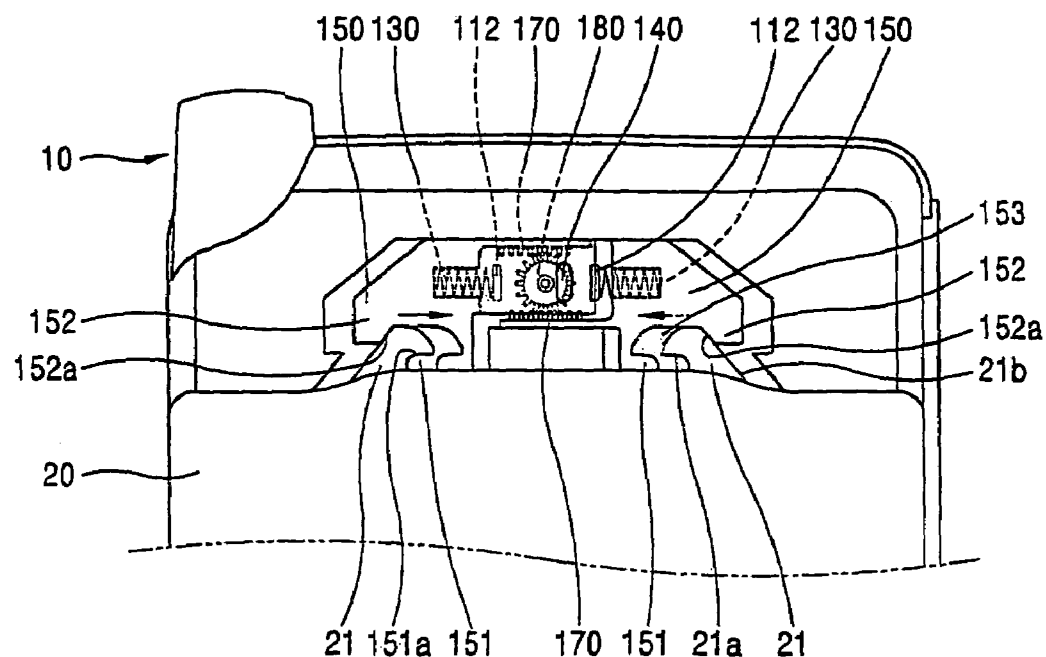
FIGS. 10A and 10B schematically depict the unlocking of a battery cover from the main body of a mobile telephone set utilizing the locking mechanism of FIG. 7.
Figure 10B:
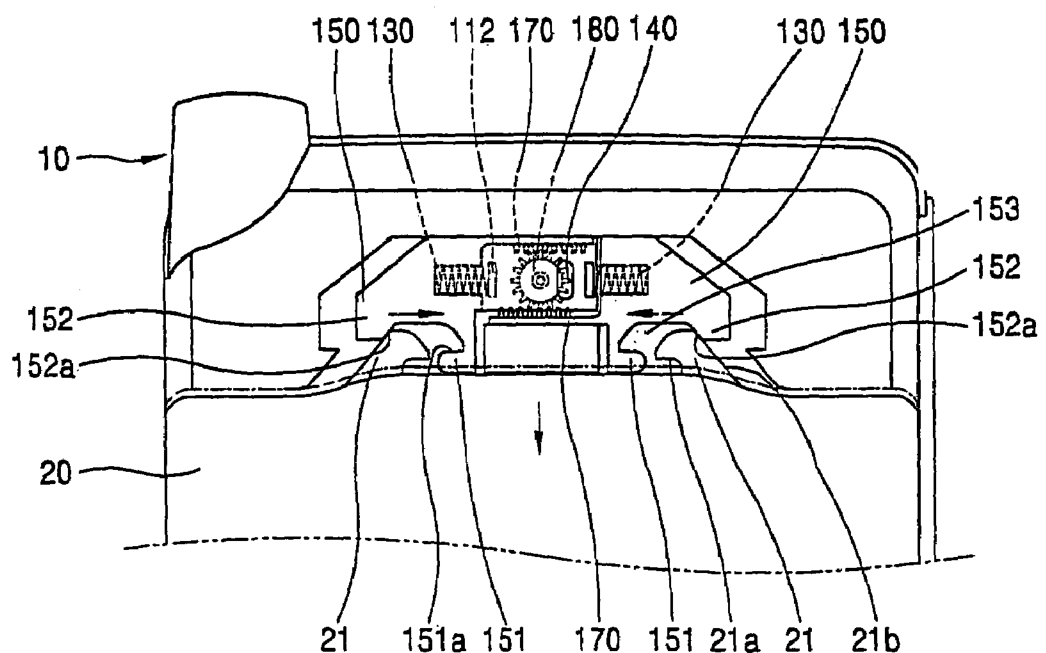

The process of unlocking battery cover 20 from main telephone body 10 is generally depicted in reference to FIGS. 10A–10B. Specifically, the user moves knob 140 generally to the right of central axis 139 (FIG. 8) which forces locking members 150 to move linearly closer to each other against the bias of elastic members 130 by rack-and-pinion action to allow disengagement of inner surface 21*a* of latching member 21 from inner surface 151*a* of first locking leg 151, respectively, on each side. Moving knob 140 results in a corresponding linear translation of the locking member having the integral connection link (160) which in turn causes a respective rack-and-pinion translation of the other locking member (150) which is not coupled to knob 140.

As each latching member (21) gradually moves out of its respective insertion space 153, inner surface 152*a* of second locking leg 152 pushes against outer surface 21*b* of its respective latching member 21 with latching member 21 sliding along inclined inner surface 152*a*, as generally shown in FIGS. 10A–10B, unlocking battery cover 20 from main body 10.

A person skilled in the art would recognize that the above-described novel locking mechanism is not restricted to mobile telephone battery cover locking applications, but may be easily implemented in various other locking applications. Other components and/or configurations may be utilized in the above-described embodiments. For example, the latching and locking members, described hereinabove and shown in the accompanying drawings, may be configured in many other ways, provided such other configurations reside within the scope of the present invention.

Moreover, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced.

While the present invention has been described in detail with regards to several embodiments, it should be appreciated that various modifications and variations may be made in the present invention without departing from the scope or spirit of the invention. In this regard it is important to note that practicing the invention is not limited to the applications described hereinabove.

Many other applications and/or alterations may be utilized provided that such other applications and/or alterations do not depart from the intended purpose of the present invention. Also, features illustrated or described as part of one embodiment can be used in another embodiment to provide yet another embodiment such that the features are not limited to the embodiments described above. Thus, it is intended that the present invention cover all such embodiments and variations as long as such embodiments and variations come within the scope of the appended claims and their equivalents.

What is claimed is:

1. A locking mechanism, comprising:

at least one latching member comprising first and second surfaces;

at least one spring loaded locking member adapted to securely engage said at least one latching member at one end when said at least one latching member is fully inserted in at least one spacing provided at said one end, said at least one latching member forcing said at least one spring loaded locking member to move against its spring bias when said at least one latching member is being inserted in said at least one spacing, said at least one spring loaded locking member having moved under its spring bias when said at least one latching member is fully inserted in said at least one spacing;

means for moving said at least one spring loaded locking member against its spring bias to allow said at least one fully inserted latching member to disengage from said at least one spring loaded locking member;

a first locking leg formed on the at least one spring loaded locking member for engaging the first surface of the latching member; and a second locking leg formed on the at least one spring loaded locking member for contacting the second surface of the at least one spring loaded locking member, wherein when the at least one spring loaded locking member is moved against its spring bias, the second locking leg pushes the second surface of the at least one latching member to disengage the at least one latching member from the at least one spring loaded locking member.

2. The locking mechanism of claim 1, wherein said moving means includes at least one groove adapted to guide the movement of said at least one spring loaded locking member and at least one knob extending integrally from said at least one spring loaded locking member to which an external force may be applied to move said at least one spring loaded locking member against its spring bias.

3. The locking mechanism of claim 1, wherein said moving means includes at least one groove adapted to guide the movement of said at least one spring loaded locking member and at least one rack and pinion mechanism operatively coupled to said at least one guiding groove and used to move said at least one spring loaded locking member against its spring bias.

4. The locking mechanism of claim 1, wherein said at least one latching member and said at least one spring loaded locking member are used to removably lock a battery cover to the main body of a mobile telephone set.

5. The locking mechanism of claim 2, wherein said at least one latching member and said at least one spring loaded locking member are used to removably lock a battery cover to the main body of a mobile telephone set.

6. The locking mechanism of claim 3, wherein said at least one latching member and said at least one spring loaded locking member are used to removably lock a battery cover to the main body of a mobile telephone set.

7. The locking mechanism of claim 2, wherein the first and second locking legs adapted are to form said at least one spacing.

8. The locking mechanism of claim 3, wherein the first and second locking legs are adapted to form said at least one spacing.

9. The locking mechanism of claim 7, wherein said first locking leg includes a first surface adapted to engage the first surface on said at least one latching member.

10. The locking mechanism of claim 8, wherein said first locking leg includes a first surface adapted to engage the first surface on said at least one latching member.

11. The locking mechanism of claim 9, wherein said second locking leg includes a first surface adapted to match a curvature of the second surface on said at least one latching member.

12. The locking mechanism of claim 10, wherein said second locking leg includes a first surface adapted to match a curvature of the second surface on said at least one latching member.

13. The locking mechanism of claim 11, wherein said second surface of said at least one latching member is adapted to allow said at least one latching member smooth entry into said at least one spacing.

14. The locking mechanism of claim 13, wherein said second surface of said at least one latching member pushes against said first surface of said second locking leg when said at least one latching member is being inserted in said at least one spacing.

15. The locking mechanism of claim 12, wherein said second surface of said at least one latching member is adapted to allow said at least one latching member smooth entry into said at least one spacing.

16. The locking mechanism of claim 15, wherein said second surface of said at least one latching member pushes against said first surface of said second locking leg when said at least one latching member is being inserted in said at least one spacing.

17. The locking mechanism of claim 14, wherein said second locking leg pushes said at least one latching member out of said at least one spacing when said at least one fully inserted latching member is being released from the grip of said first and second locking legs.

18. The locking mechanism of claim 16, wherein said second locking leg pushes said at least one latching member out of said at least one spacing when said at least one fully inserted latching member is being released from the grip of said first and second locking legs.

19. The locking mechanism of claim 3, wherein said moving means further includes at least one connection link integrally extending from said at least one locking member, and at least one knob protruding from said at least one connection link to which an external force is applied to move said at least one spring loaded locking member against its spring bias.

20. A mobile communication terminal, comprising:

a terminal body;

a battery cover detachably mounted at the terminal body and to which a battery is mounted; and a locking mechanism formed between the terminal body and the battery cover for locking the battery cover to the terminal body, in which the locking mechanism comprises:

at least one latching member formed at the battery cover;

a locking member movably mounted at the terminal body and having a first locking leg, the first locking leg adapted to engage the at least one latching member to lock the battery cover to the terminal body or release the battery cover from the terminal body;

a first elastic member coupled between the first locking leg and at least one support member, the elastic member being biased toward the first locking leg, wherein the first locking leg and the at least one latching member are formed in such a manner to push the battery cover away from the terminal body in a releasing direction when the first locking leg disengages the at least one latching member; and a second locking leg and a second elastic member, the second elastic member coupled between the second locking leg and the at least one support member and being biased toward the second locking leg;

wherein at least one of the first and second locking legs has an inner surface that is inclined at a certain angle so as to substantially match a curvature of a corresponding outer surface of the at least one latching member;

wherein the first and second locking legs linearly move closer to each other in a width direction of the battery cover against the bias of the at least one of the first and second elastic members to allow disengagement of the at least one latching member when an external force is applied to the locking member.

21. The terminal of claim 20, wherein the locking member is mounted at the terminal body to be linearly movable in a width direction, and has a spring for restoring the locking member to an original state.

22. The terminal of claim 20, wherein the locking member is constructed as one pair facing each other in a width direction of the terminal body, and a spring is arranged between the pair of locking members.

23. The terminal of claim 20, wherein the at least one latching member has a portion locked by the first locking leg at one side thereof, and has an inclination surface contacting the second locking leg and slide-movable at another side thereof.

24. The terminal of claim 23, wherein the second locking leg has an inner surface having an the same inclination surface earns as an inclination surface of another side of the at least one latching member.

25. A locking mechanism comprising:

at least one latching member formed at a cover of a battery;

a locking member movably mounted at a main body and having a first locking leg, the first locking leg adapted to engage the at least one latching member to lock the cover of the battery to the main body or release the cover of the battery from the main body;

a first elastic member coupled between the first locking leg and at least one support member, the elastic member being biased toward the first locking leg, wherein the first locking leg and the at least one latching member are formed in such a manner to push the cover of the battery away from the main body in a releasing direction when the first locking leg disengages the at least one latching member; and a second locking leg and a second elastic member, the second elastic member coupled between the second locking leg and the at least one support member and being biased toward the second locking leg;

wherein at least one of the first and second locking legs has an inner surface that is inclined at a certain angle so as to substantially match a curvature of a corresponding outer surface of the at least one latching member;

wherein the first and second locking legs linearly move closer to each other in a width direction of the cover of the battery against the bias of the at least one of the first and second elastic members to allow disengagement of the at least one latching member when an external force is applied to the locking member.

26. The locking mechanism of claim 25, wherein the main body is a mobile communication terminal.

27. The locking mechanism of claim 25, wherein the locking member comprises a user grip knob disposed at no less than one of the first and second locking legs to allow a user to linearly move the first and second locking legs closer to each other against the bias of the at least one of the first and second elastic members to disengage the cover of the battery from the main body in the releasing direction.

28. The locking mechanism of claim 25, wherein the locking member comprises a pair of opposed rack gears with each rack gear extending from each of the first and second locking legs, and a pinion gear rotatably engaged to mesh with the rack gears to allow the first and second locking legs to linearly move with respect to each other in the width direction to disengage the cover of the battery from the main body in the releasing direction.

* * * * *